(12) United States Patent
Cohen et al.

(10) Patent No.: US 9,897,220 B2
(45) Date of Patent: Feb. 20, 2018

(54) BURST DISK PROTECTED VALVE

(71) Applicant: SodaStream Industries Ltd., Ben Gurion Airport (IL)

(72) Inventors: Avi Cohen, Jerusalem (IL); Guy Danieli, Jerusalem (IL)

(73) Assignee: SodaStream Industries Ltd., Air Port City (IL)

( * ) Notice: Subject to any disclaimer, the term of this patent is extended or adjusted under 35 U.S.C. 154(b) by 32 days.

(21) Appl. No.: 14/455,950

(22) Filed: Aug. 11, 2014

(65) Prior Publication Data

US 2015/0040991 A1    Feb. 12, 2015

Related U.S. Application Data

(60) Provisional application No. 61/864,660, filed on Aug. 12, 2013, provisional application No. 61/911,500, filed on Dec. 4, 2013.

(51) Int. Cl.
| | |
|---|---|
| *F16K 17/16* | (2006.01) |
| *F16K 17/40* | (2006.01) |
| *F16K 17/04* | (2006.01) |
| *B01F 3/04* | (2006.01) |

(52) U.S. Cl.
CPC .......... *F16K 17/403* (2013.01); *F16K 17/048* (2013.01); *F16K 17/16* (2013.01); *B01F 2003/04822* (2013.01); *Y10T 137/0385* (2015.04); *Y10T 137/1714* (2015.04)

(58) Field of Classification Search
CPC ......... F16K 17/403; B01F 2003/04822; Y10T 137/0385; Y10T 137/1714; Y10T 137/1729; Y10T 137/7794; Y10T 137/7845; Y10T 137/7773; Y10T 137/7772; B67D 1/0071; B67D 1/0081; B67D 2001/0093; B67D 2001/0094
USPC ............ 137/68.23, 68.28, 613, 12.5, 505.11, 137/512.2, 493.1, 493.2; 261/38, 39.1
See application file for complete search history.

(56) References Cited

U.S. PATENT DOCUMENTS

| | | | | |
|---|---|---|---|---|
| 1,571,022 | A * | 1/1926 | Obert | F16K 17/16 137/71 |
| RE19,087 | E * | 2/1934 | Minor | F16K 35/10 137/614.2 |
| 2,562,672 | A * | 7/1951 | Kunert | F16K 17/00 137/71 |

(Continued)

FOREIGN PATENT DOCUMENTS

GB        2036905 A  *  7/1980  ........... F16K 17/403

OTHER PUBLICATIONS

International Search Report for corresponding PCT application PCT/IB2014/063845 dated Dec. 12, 2014.

(Continued)

*Primary Examiner* — Minh Le
(74) *Attorney, Agent, or Firm* — Pearl Cohen Zedek Latzer Baratz LLP

(57) ABSTRACT

A safety unit for a home carbonation machine that includes a valve to release gas from a sealed state at a first pressure and a backup element set to rupture at a second higher pressure when the valve malfunctions. The valve also includes a backup element housing which moves to vent the gas via an outlet during carbonation and which has a conduit to direct the gas to the backup element.

9 Claims, 9 Drawing Sheets

(56) References Cited

U.S. PATENT DOCUMENTS

| | | | | |
|---|---|---|---|---|
| 3,693,644 A * | 9/1972 | Dilorenzo | ............. | F16K 17/162 137/493.2 |
| 3,834,412 A * | 9/1974 | Fannin | .................... | F16K 17/16 137/588 |
| 4,064,890 A * | 12/1977 | Collins, Jr. | ........ | G05D 16/0666 137/505.11 |
| 4,328,827 A * | 5/1982 | Enjolras | ................ | F16K 17/044 137/512.2 |
| 4,352,365 A * | 10/1982 | Boccardo | ................ | F16K 17/16 137/68.23 |
| 4,399,081 A * | 8/1983 | Mabb | ........................ | A23L 2/54 141/278 |
| 4,610,282 A * | 9/1986 | Brooks | ............... | B01F 3/04801 141/46 |
| 4,687,421 A * | 8/1987 | Cameron | ................ | F04B 49/10 137/543.21 |
| 4,999,140 A | 3/1991 | Sutherland | | |
| 5,031,799 A | 7/1991 | Owen | | |
| 6,145,595 A * | 11/2000 | Burris, II | ............. | E21B 34/108 137/68.23 |
| 6,148,841 A * | 11/2000 | Davidson | ................ | F16K 1/305 137/68.23 |
| 6,240,951 B1 * | 6/2001 | Yori | ...................... | F16K 15/207 137/224 |
| 6,948,698 B1 * | 9/2005 | Scott | ........................ | F16K 1/306 137/68.19 |
| 7,051,751 B2 * | 5/2006 | Carroll | .................... | F16K 17/16 137/68.19 |
| 7,975,988 B2 * | 7/2011 | Thomson | ............. | B01F 3/04794 261/65 |
| 8,455,032 B2 * | 6/2013 | Gormley | .................... | A23L 2/54 222/394 |
| 9,101,889 B2 * | 8/2015 | Ottoson | ............. | B01F 3/04794 |
| 2003/0075813 A1 | 4/2003 | Kiefer | | |
| 2005/0194050 A1 * | 9/2005 | Pietrantoni | ............. | A62B 9/022 137/613 |
| 2006/0124170 A1 * | 6/2006 | Schaefer | ............. | F04B 27/1036 137/68.19 |
| 2008/0078457 A1 | 4/2008 | Sandiford | | |
| 2009/0211647 A1 | 8/2009 | Anderson et al. | | |
| 2011/0036101 A1 * | 2/2011 | Tigwell | .................... | H01F 6/02 62/48.1 |
| 2013/0037969 A1 | 2/2013 | Ring et al. | | |
| 2013/0213492 A1 * | 8/2013 | Newman | ................. | F16K 17/40 137/68.23 |
| 2015/0023127 A1 * | 1/2015 | Chon | ........................ | C01F 5/24 366/167.1 |

OTHER PUBLICATIONS

Supplementary European Search Report for corresponding EP application 14836343 dated Mar. 7, 2017.

* cited by examiner

BURST DISK PROTECTED VALVE

CROSS-REFERENCE TO RELATED APPLICATIONS

This application claims benefit from U.S. Provisional Patent Applications No. 61/864,660, filed 12 Aug. 2013 and No. 61/911,500, filed 4 Dec. 2013 which are hereby incorporated in their entirety by reference.

FIELD OF THE INVENTION

The present invention relates to carbonation machines generally and to pressure release valves in particular.

BACKGROUND OF THE INVENTION

Soda machines for the carbonation of beverages are known in the art. Most such devices for home carbonation are designed for manual operation; typically comprising a manually operated gas release valve to release carbon dioxide ($CO_2$) into a bottle of water from an attached pressurized cylinder. Such machines typically also comprise one or more safety pressure release valves which are designed to vent if excess pressure builds up during the carbonization process.

SUMMARY OF THE PRESENT INVENTION

There is provided, in accordance with a preferred embodiment of the present invention, a safety unit for a home carbonation machine. The unit includes a valve to release gas from a sealed state at a first pressure and a backup element set to rupture at a second higher pressure when the valve malfunctions.

Moreover, in accordance with a preferred embodiment of the present invention, the valve includes a backup element housing which moves to vent the gas via an outlet during carbonation.

Further, in accordance with a preferred embodiment of the present invention, the backup element housing has a conduit to direct the gas to the backup element.

Still further, in accordance with a preferred embodiment of the present invention, the backup element housing has a secondary outlet to vent the excess gas after the backup element is ruptured.

Additionally, in accordance with a preferred embodiment of the present invention, the backup element is a burst disk.

Moreover, in accordance with a preferred embodiment of the present invention, the burst disk includes a membrane manufactured from at least one of nickel, stainless steel and plastic.

Further, in accordance with a preferred embodiment of the present invention, the backup element housing comprises two rings to hold the membrane.

There is provided, in accordance with a preferred embodiment of the present invention, a method for a safety valve. The method includes releasing gas from the safety valve at a first pressure and rupturing a backup element of the safety valve at a second higher pressure when the releasing malfunctions.

Moreover, in accordance with a preferred embodiment of the present invention the releasing includes venting the gas via an outlet during carbonation.

Moreover, in accordance with a preferred embodiment of the present invention comprising directing the gas to the backup element when the releasing malfunctions.

Further, in accordance with a preferred embodiment of the present invention the method also includes venting the excess gas after the rupturing.

Still further, in accordance with a preferred embodiment of the present invention, the backup element is a burst disk.

Additionally, in accordance with a preferred embodiment of the present invention, the burst disk includes a membrane manufactured from at least one of nickel, stainless steel and plastic.

Moreover, in accordance with a preferred embodiment of the present invention, backup element housing comprises two rings to hold the membrane.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
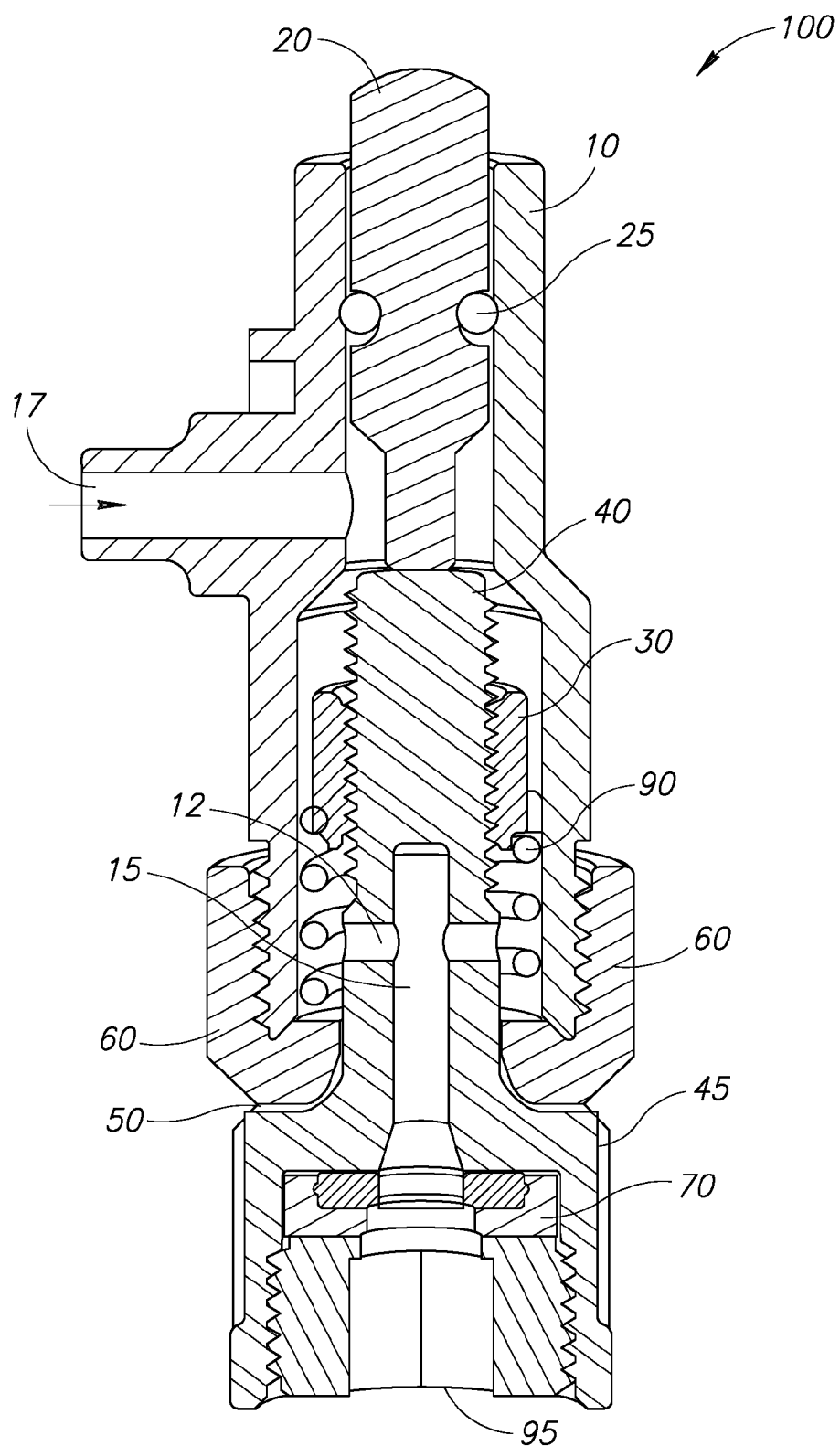
FIGS. 1A, 1B, 1C and 1D are schematic illustrations of a normally closed burst disk protected safety release valve, designed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that although the soda machines discussed in the background are intended to be used with water only, users may also attempt (intentionally and unintentionally) to carbonate non-water beverages such as wine or orange juice or re-carbonate fizzy drinks that have gone flat.

It will be appreciated as is described in the background, that typical soda machines also incorporate safety pressure release valves. These valves, such as that described in U.S. patent application Ser. No. 13/570,294 filed Aug. 9, 2012, incorporated herein by reference and assigned to the common assignee of the present invention provide, are purposely configured to vent if excess pressure builds up during the carbonization process over a pre-determined threshold. U.S. patent application Ser. No. 13/570,294 describes a normally open release valve that is open before and after the carbonation process and is only closed when carbonation is taking place in order to provide a sealed environment. The valve may also contain a spring that may be preset to open the valve when pressure build up during carbonation exceeds a given threshold.

During the carbonation process, due to the addition of carbon dioxide, minimal splashing of the liquid that is being carbonated is inevitable. This splashing may cause small amounts of the liquid in question to reach/enter elements of the pertinent carbonation system such as the safety release valve. Applicants have realized that this splashing in relation to water is harmless and may be ignored, but that splashing of other beverages may potentially cause blockages to elements due to the level of sugar contained within. The sugar may "stick" to these elements, often forming a sticky layer. This sticky layer may restrict the movement of these elements and may also block the flow of gas. It will be appreciated that restricting the movement of elements in safety valves and blocking the flow of gas may cause pressure build up within the bottle of liquid which in turn may cause an uncontrolled explosion of the bottle under pressure.

Applicants have further realized that, since the purpose of such safety pressure release valves is to provide a backup gas release system during the carbonation process, a secondary backup gas release system may be desirable when non-water beverages are being carbonated and there is a danger of impaired functionality of the safety pressure release valve due to the restrictive movements of its elements or if for any other reason, pressure starts to rise uncontrollably in the carbonating bottle.

Figure 1B:
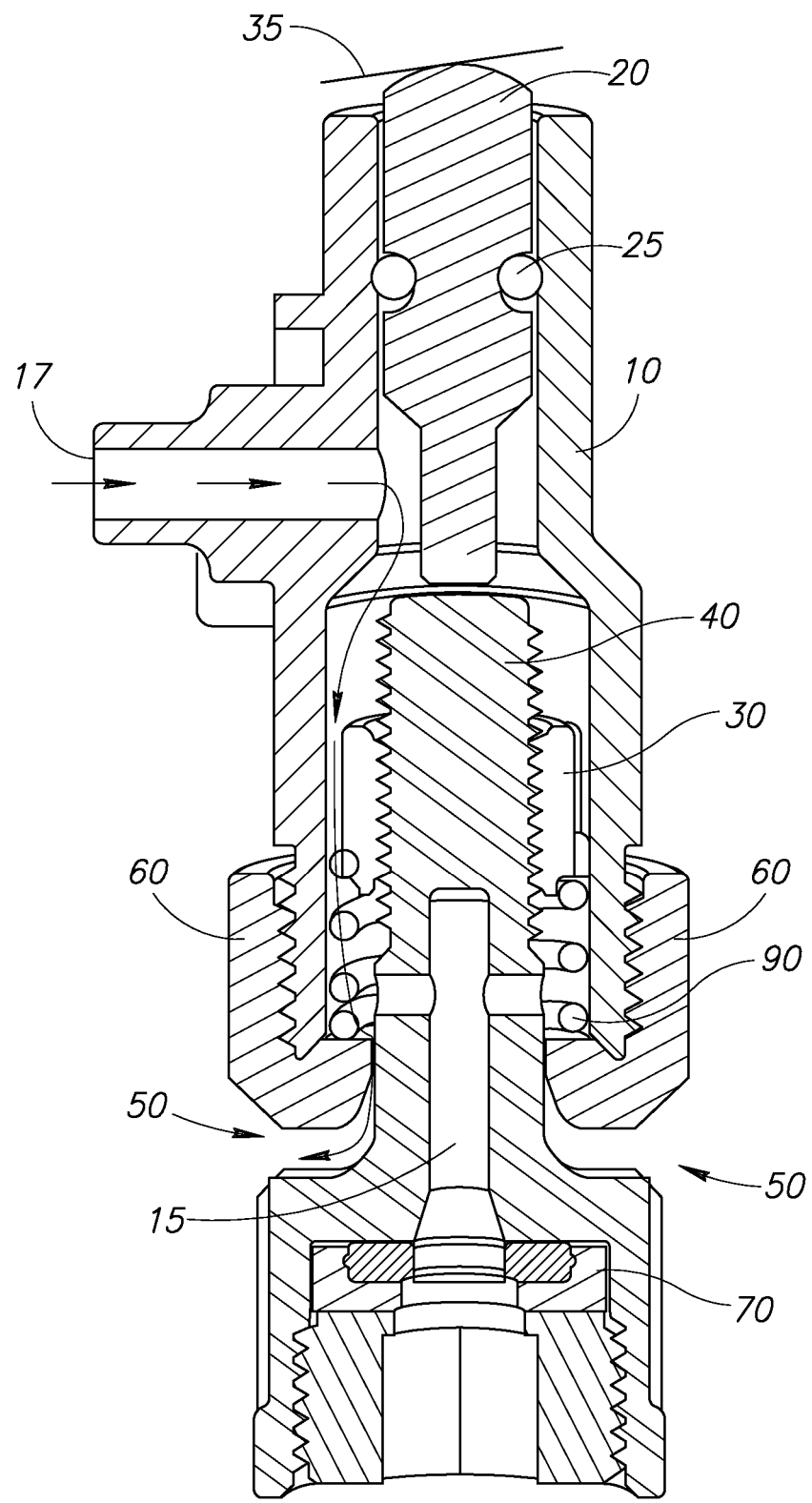
Figure 1C:
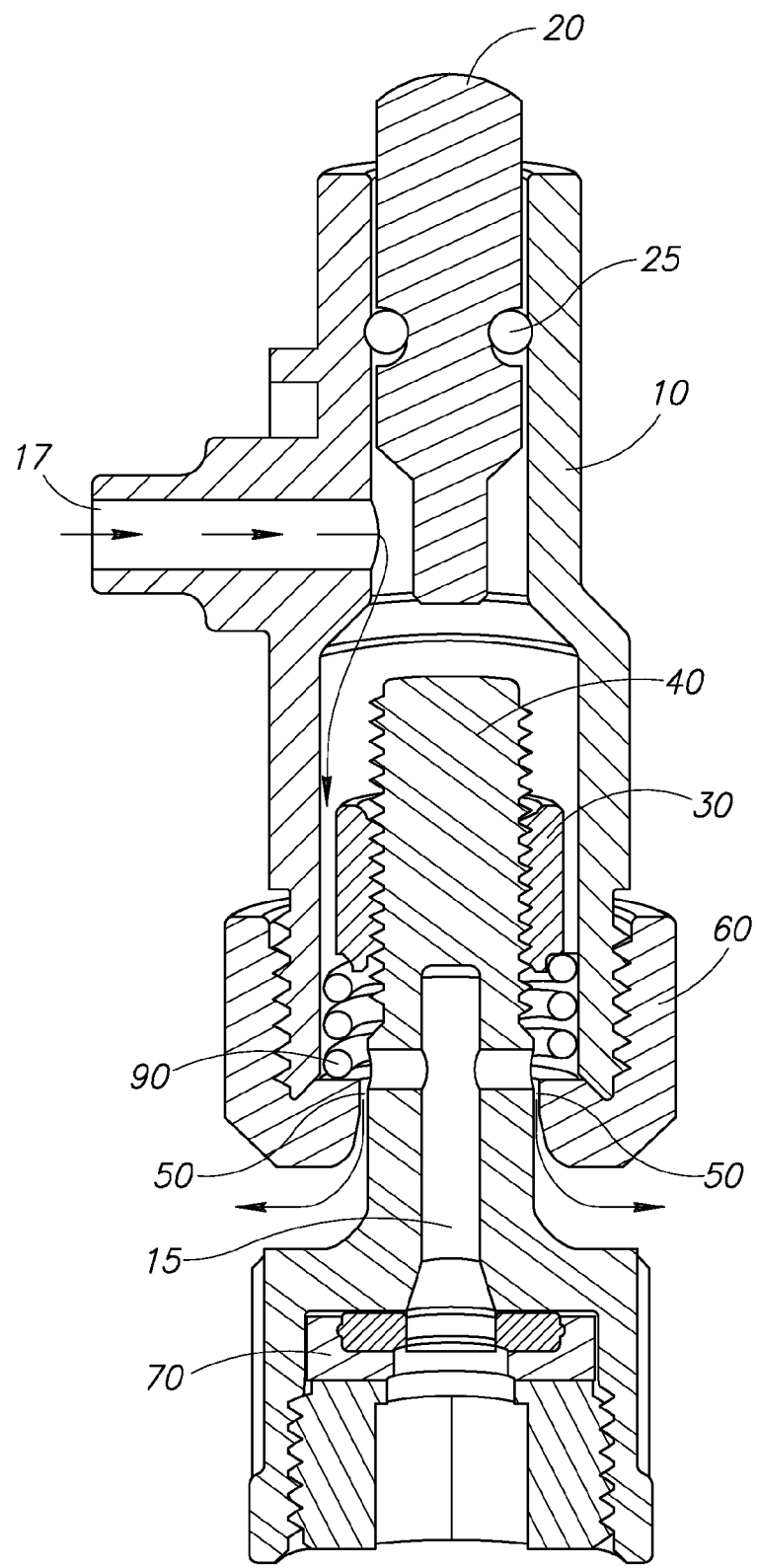
Figure 1D:
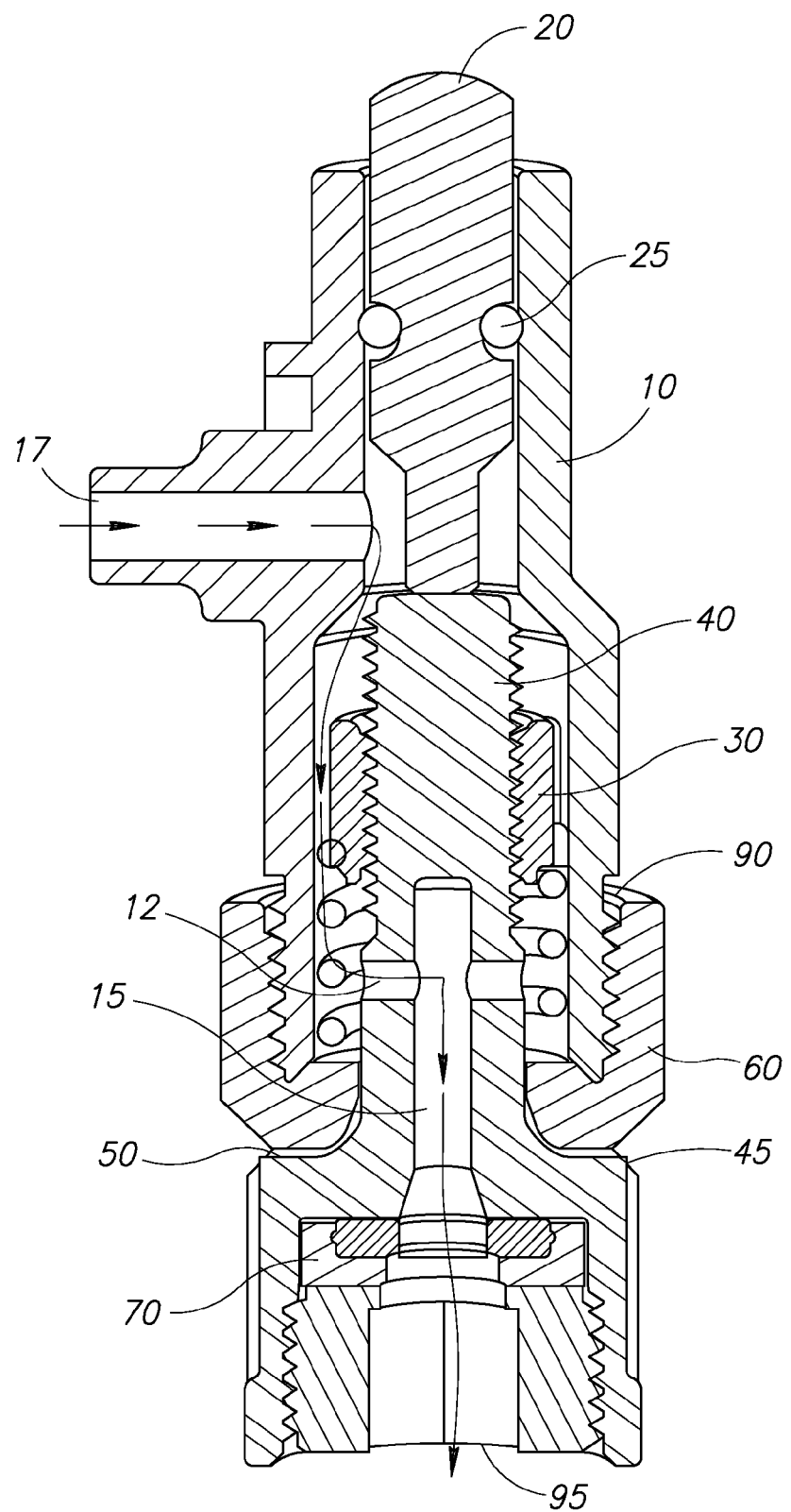

Reference is now made to FIGS. 1A, 1B, 1C and 1D which illustrate a burst disk protected safety release valve 100 in accordance with an embodiment of the present invention. In FIG. 1A valve 100 is shown in its static normally closed position. FIG. 1B shows valve 100 in its open state before and after carbonation. FIG. 1C shows valve 100 during the carbonation process when there is a need to vent excess gas due to a pressure build up and FIG. 1D shows valve 100 during the carbonation process when there is a need to vent excess gas and there is blockage of the flow of gas and/or restrictive movement of its elements as described in herein above.

Valve 100 comprises a valve carrier 10, a plunger 20, a spring nut 30, a burst disk housing 40, a valve body nut 60 and a spring 90. Valve carrier 10 may further comprise an inlet 17 to allow the entry of excess gas, a hollow area 15, a conduit 12, a base area 45 and a safety outlet 95. Plunger 20 may comprise an O-ring 25 to ensure that no gas may escape between plunger 20 and the walls of valve carrier 10. Housing 40 may comprise a disk assembly 70 further comprising a burst disk 80 as described in detail herein below.

It will be appreciated that in its static state as is illustrated in FIG. 1A, valve 100 is closed, spring 90 may be uncompressed and spring nut 30 may hold housing 40 in place so that valve body nut 60 rests on base area 45 ensuring that valve sealing area 50 is totally sealed. Plunger 20 may also rest on the top of housing 40. Thus any gas entering valve 100 via inlet 17 may remain within valve 100 and may not be able to escape. During the carbonation process, valve 100 may be opened by pushing plunger 20 inwards as is illustrated in FIG. 1B to which reference is now made in order to release excess gas that may build up. It will be appreciated that this may be done mechanically by a cam 35 or another part automatically as part of the carbonation process.

When plunger 20 is depressed, the force against housing 40 may cause spring nut 30 to push downwards on spring 90. Spring 90 may be compressed allowing housing 40 to move downwards. It will be appreciated that the movement of housing 40 downwards may open sealing area 50 between valve body nut 60 and base area 45 since valve body nut 60 may remain in place. Thus any excess gas entering valve 100 via inlet 17 may flow through valve 100 and exit via the area between the opened sealing area 50 as is illustrated by the arrows. It will be appreciated that when carbonation is complete, plunger 20 may be released from its mechanical lock and spring 90 may return both housing 40 and plunger 20 to their normally closed positions.

Reference is now made to FIG. 1C which illustrates valve 100 in the scenario when valve 100 is in a normally closed position and there is a buildup of excess pressure within the pertinent carbonation system. It will be appreciated that plunger 20 may remain in position since in this scenario valve 100 is closed and there is no intention to open it by depressing plunger 20. Excess gas may enter via inlet 17 as described herein above. The pressure of the entering gas may push housing 40 downwards while plunger 20 remains in place. The downward force of housing 40 against spring nut 30 may in turn cause spring 90 to compress thus lowering housing 60 and opening sealing area 50 as described in herein above.

Reference is now made to FIG. 1D which illustrates a typical scenario that may occur for example, when a non-water beverage is carbonated using the pertinent carbonation system. It will be appreciated that the splashing (as described herein above) may cause the non-water beverage being carbonated to enter valve 100 via inlet 17. As described herein above, the stickiness of the non-water beverage may for example, cause housing 40 and base area 45 to stick to valve body nut 60 restricting its downwards movement. Therefore in a scenario where valve 100 is closed and excess gas enters via inlet 17 as is illustrated in FIG. 1C, housing 40 may not be able to move downwards preventing sealing area 50 from opening up and thus valve 100 may remain closed. It will be appreciated that in a non-carbonation mode, this may not be so critical since there is no gas to vent, but in carbonation mode this could be dangerous. If the pressure build up within the bottle is too great (for example 20 bars) and there is no means to vent it due to the blocked valve, an uncontrolled explosion of the bottle in which carbonation is taking place may occur.

Figure 2:
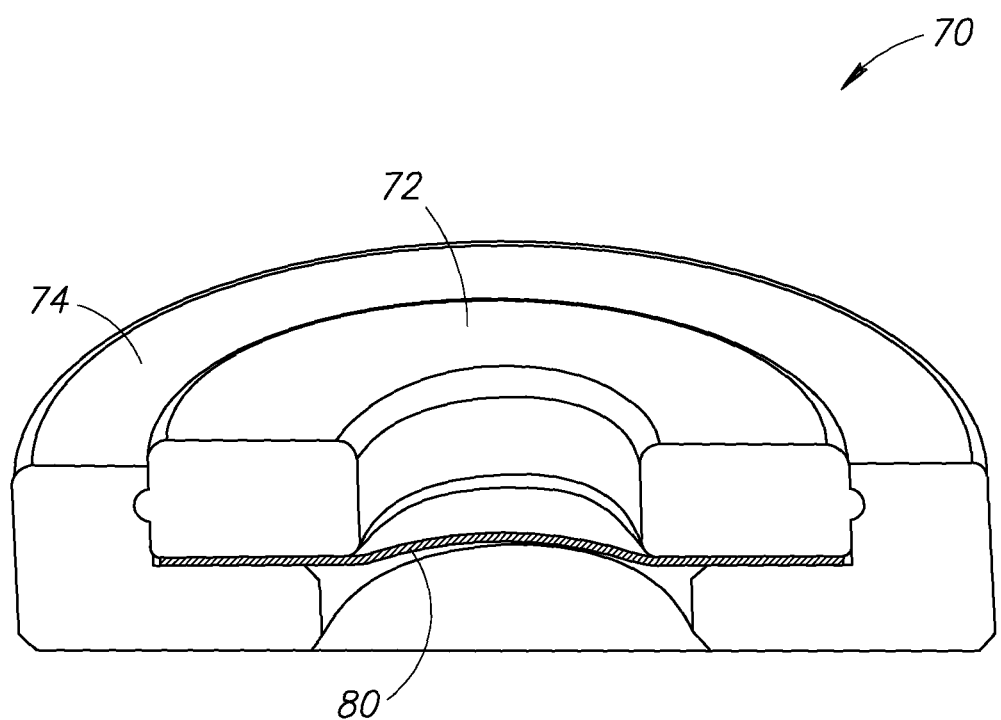
FIG. 2 is a schematic illustration of a burst disk assembly.

In accordance with a preferred embodiment of the present invention, a burst disc 80 may be held within burst disk housing 70 as is illustrated in FIG. 2 to which reference is now made. Burst disk housing 70 may comprise of a polymer ring 72 and a polymer enclosure 74. It will be further appreciated that burst disk 80 may be held tautly between polymer ring 72 and polymer enclosure 74.

Burst disk 80 may be a membrane manufactured from nickel, stainless steel, plastic or any other suitable flexible material and may be configured to rupture whenever the pressure in valve 100 exceeds a set pressure point, for example a threshold pressure of 14-16 bars. It will be appreciated that the failure of sealing area 50 to open may allow for this pressure build up within valve 100. When disc 80 may rupture, a new path may be created via conduit 12 allowing gas to be released via hollow area 15, through ruptured burst disc 80, via safety outlet 95 and into the atmosphere as shown by the arrows in FIG. 1D to which reference is now made.

It will be appreciated that the first time carbonation is performed on a non-water beverage, any liquid entering valve 100 during may be expelled via open sealing area 50 together with any excess gas as indicated by the arrows in FIGS. 1B and 1C and no malfunction of the of the pertinent carbonation machine may occur. It will be appreciated it is the aftermath of a first time carbonation of a non-water beverage that may leave a sticky layer behind which may cause parts to stick as described herein above.

It will also be appreciated that valve 100 may be considered self-purging or self-cleaning. Any liquid entering valve 100 due to splashing (as described here in above) can only flow the same way as the excess gas as indicated by the arrows in FIGS. 1B and 1C and at a substantial flow rate. It will be appreciated that the direction of and speed of flow of gas and liquid flowing through valve 100 may actually remove some of the stickiness that may have formed within the walls between carrier 10 and housing 40 and around sealing area 50 from a previous carbonation using a non-water beverage, thus decreasing the chances of sealing area 50 being unable to open to release excess gas if necessary.

Figure 3A:
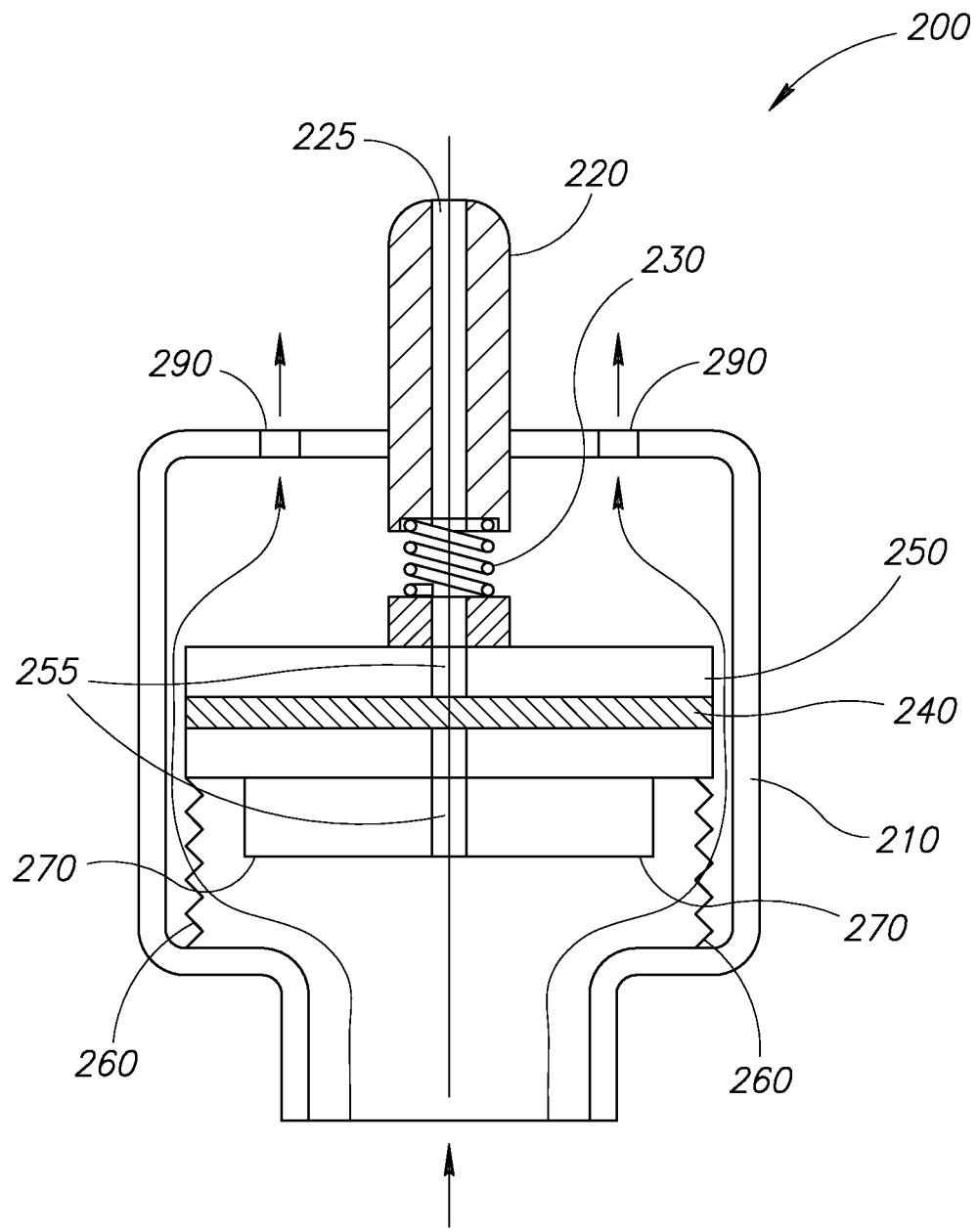
FIGS. 3A, 3B, 3C and 3D are schematic illustrations of a normally open burst disk protected safety release valve, designed and operative in accordance with a preferred embodiment of the present invention.
Figure 3B:
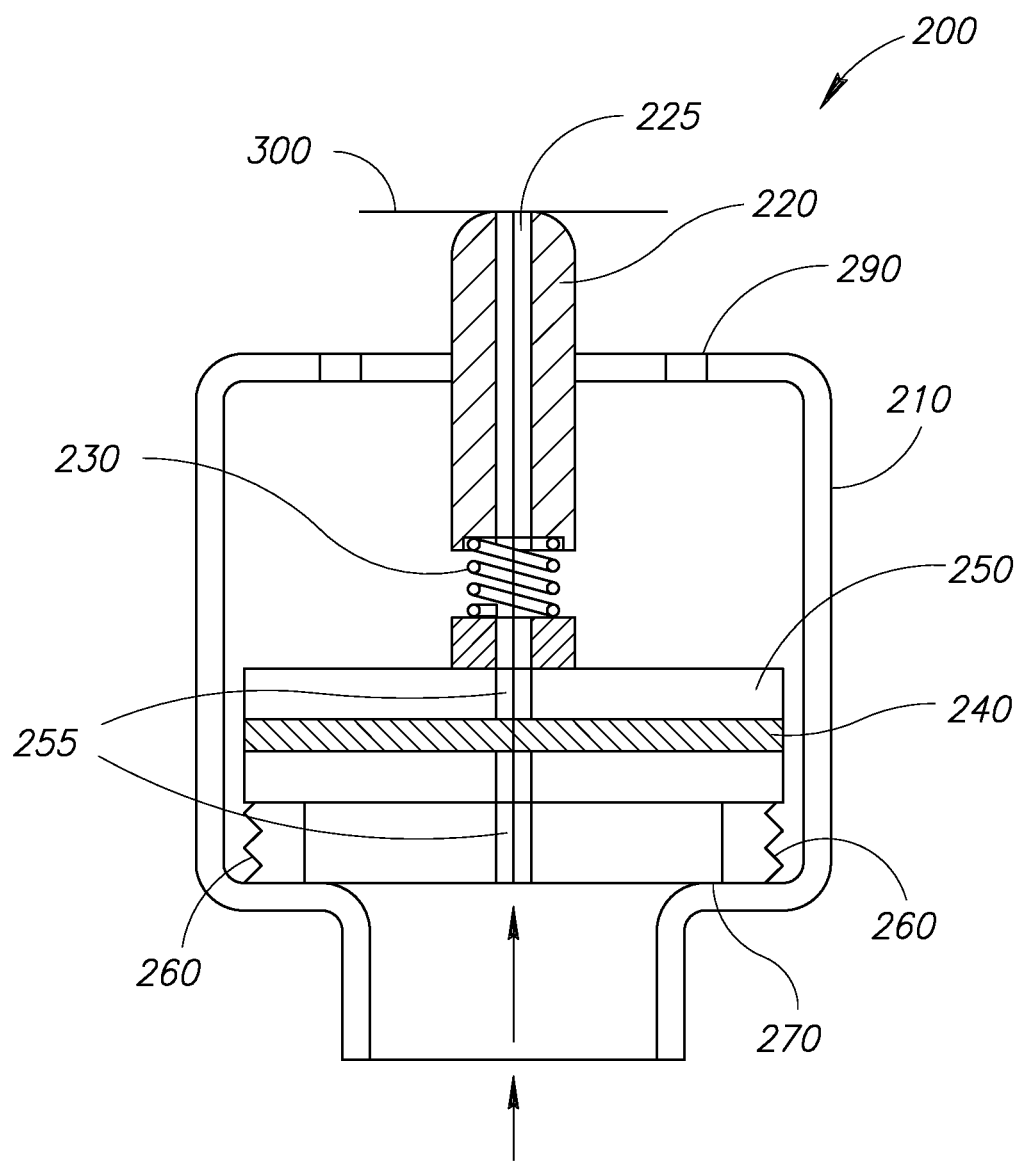
Figure 3C:
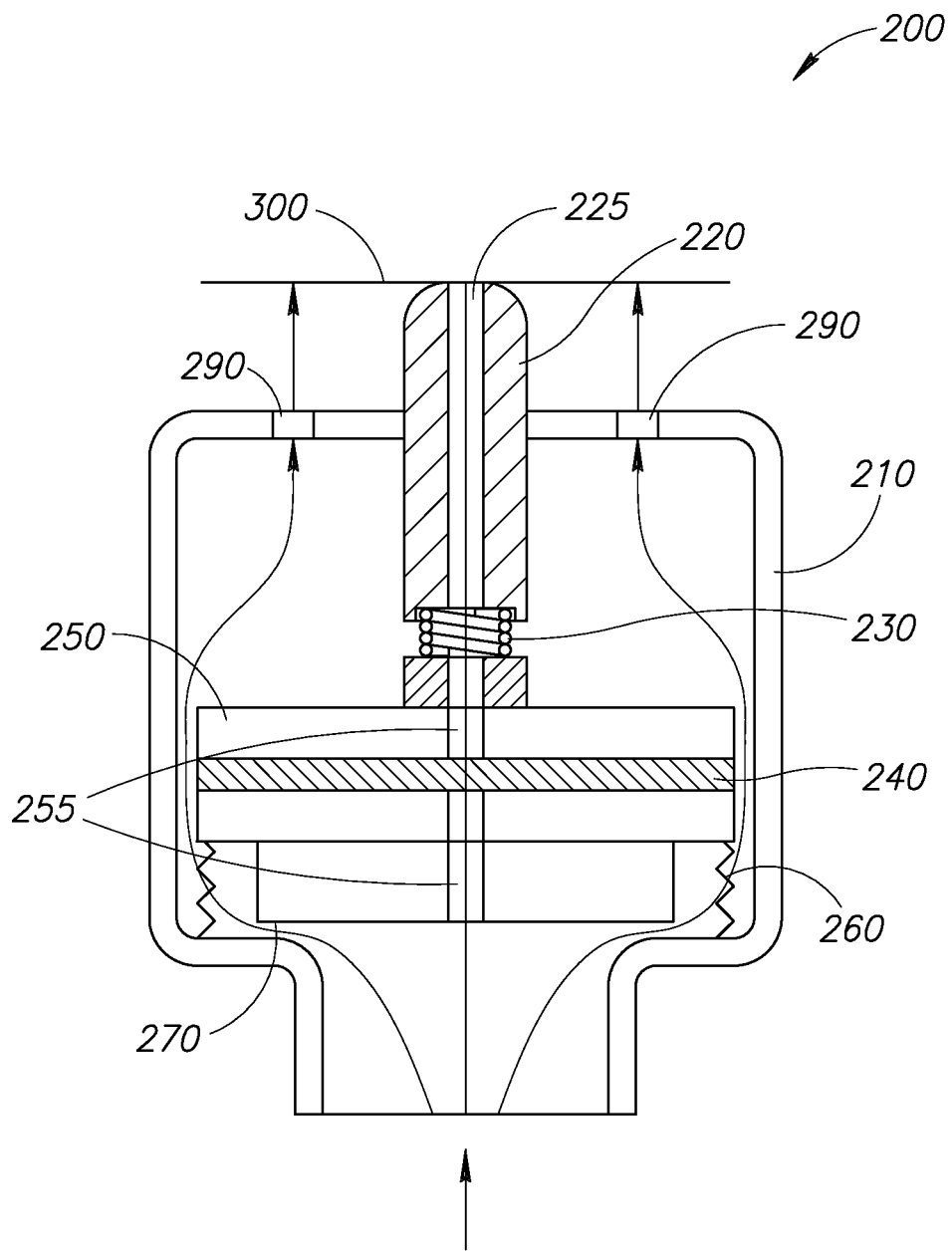
Figure 3D:
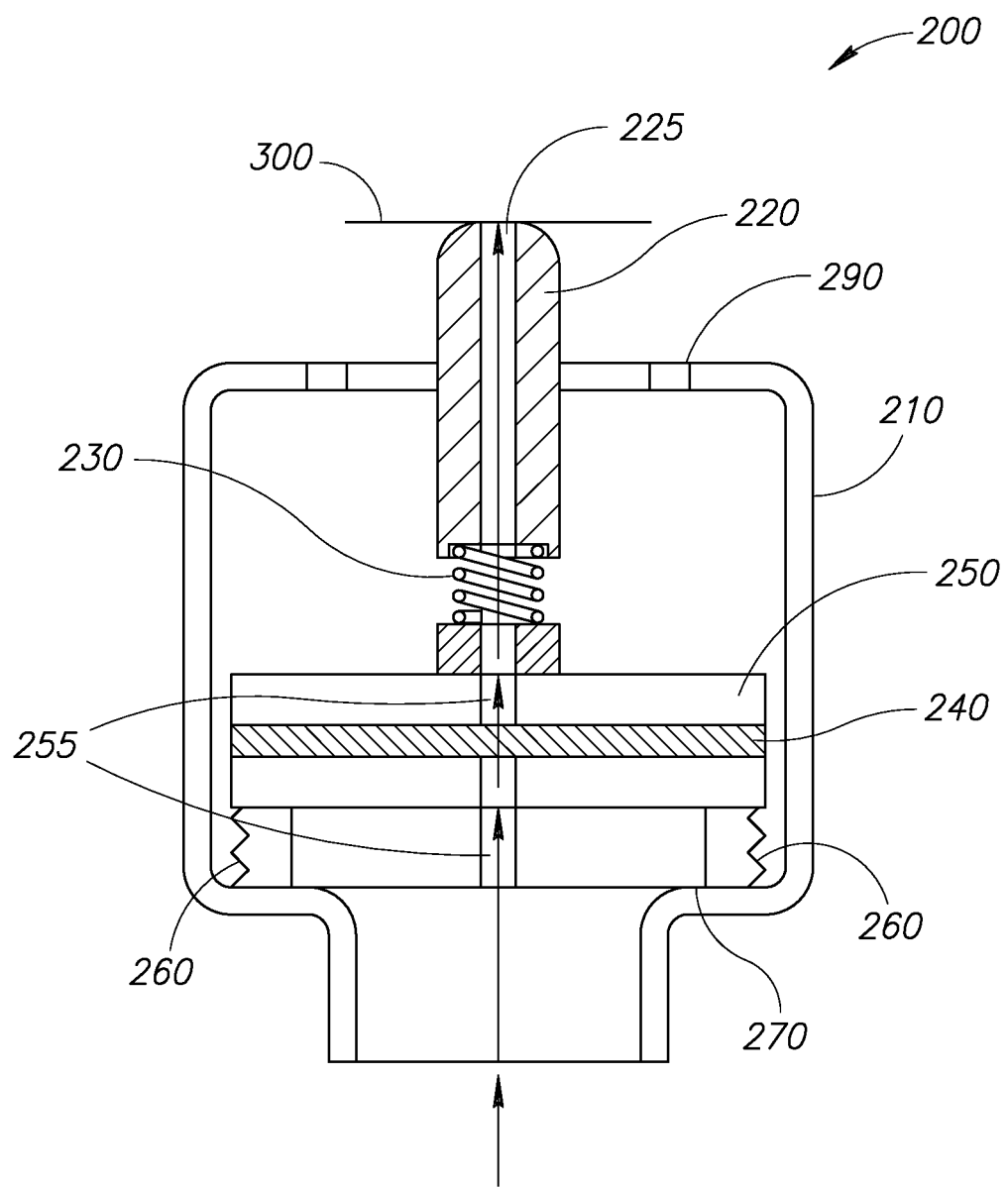

In an alternative embodiment, valve 100 may be a normally open valve 200 as is illustrated in FIGS. 3A, 3B, 3C and 3D. In FIG. 3A valve 200 is shown in its static normally open position. FIG. 3B shows valve 200 during the carbonation process when valve 200 is closed. FIG. 3C shows valve 200 during the carbonation process when there is a need to vent excess gas and FIG. 3D shows valve 200 during the carbonation process when there is a need to vent excess gas and there is blockage of the flow of gas and/or restrictive movement of its elements as described in herein above.

Valve 200 comprises a housing 210, a hollow pin 220, a relief spring 230, a burst disk 240, a normally open plunger 250, a normally open spring 260 and a seal 270. Housing 210 may further comprise an outlet 290. Hollow pin 220 may comprise hollow area 225. Normally open plunger 250 may also comprise a hollow area 255 which may run through normally open plunger 250 but which may be blocked by the presence of burst disk 240. Relief spring 230 may allow normally open plunger 250 to move up and down within housing 210.

It will be appreciated that in its static state as is illustrated in FIG. 3A, valve 200 is open and normally open plunger 250 may be held in place by normally open spring 260. In this state, gas may freely flow through valve 200 and out through outlet 290 to the atmosphere as is illustrated by the arrows.

During carbonation, hollow pin 220 may be pushed downwards via a cam 300 which may be part of the pertinent home carbonation system in use as is illustrated in FIG. 3B to which reference is now made. It will be appreciated that the force applied to hollow pin 220 by cam 300 may push hollow pin 220 downwards which may also apply a force to relief spring 230. It will be also appreciated that the tension of relief spring 230 may be set so that the force applied by cam 300 and hollow pin 220 do not compress it, but instead push it downwards applying pressure to normally open plunger 250, which may also move downwards until it rests on seal 270, thus totally sealing valve 200. In this state, excess gas may not flow through seal 270 and instead, the only outlet may be via hollow area 255. As described herein above, hollow area 255 may be blocked by burst disc 240, preventing the flow of gas.

Reference is now made to FIG. 3C which illustrates what happens to valve 200 when pressure build up in the bottle due to the carbonation process exceeds a required opening pressure of, for example 8 bars. It will be appreciated that the force of pressure of gas against normally open plunger 250 and in turn relief spring 230 may overcome the preset tension of relief spring 230 and may cause relief spring 230 to be compressed, thus allowing normally open plunger 250 to be pushed upwards by the pressure of the excess gas, even though hollow pin 220 is still in its downward state due to the continuing pressure applied by cam 300. This movement of normally open plunger 250 upwards may unseal valve 200 and may allow gas to freely flow through valve 200, via seal 270 and out through outlet 290 as indicated by the arrows in FIG. 3C. It will also be appreciated that some gas may attempt to flow through hollow area 255 but burst disc 240 may block the gas from being released.

Reference is now made to FIG. 3D which illustrates the scenario that may occur when a non-water beverage is carbonated using the pertinent carbonation system as is described herein above and the stickiness of a non-water beverage causes normally open plunger 250 to "stick" to the inside wall of housing 210, restricting the movement of normally open plunger 250 or in a situation when pressure starts to rise uncontrollably in the system. Therefore, when the gas entering valve 200 exceeds the required opening pressure of 8 bars, even though relief spring 230 may compress as described herein above, normally open plunger 250 may not move and valve 200 may remain closed.

In accordance with a preferred embodiment of the present invention and as described herein above, burst disc 240 may be configured to rupture whenever the pressure in valve 200 exceeds a set pressure point, for example a threshold pressure of 20 bars. When disc 240 ruptures gas may be released through the ruptured burst disc 20, via hollow areas 255 and 225 and into the atmosphere.

It will be appreciated that burst disk 240 may be constructed and implemented as disk 80.

Thus, a release valve incorporating a burst disc which may be ruptured at a high pressure, may provide a backup solution for a safety valve when dealing with rising pressure during an uncontrollable carbonation process when, for whatever reason, the process continues past safe limits and when the regular release mechanism fails.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. A safety unit, the unit comprising:
an inlet to receive gas from a home carbonation machine;
a backup element housing having a conduit therethrough with an exit outside of said safety unit;
a valve housing against which the backup element housing is pressable to close a closeable path between said valve housing and said backup element housing, said backup element housing being movable away from the valve housing by the gas when the gas is at a first pressure so as to open the closeable path to outside of said safety unit; and
a backup element across said conduit, said conduit to redirect said gas towards said backup element when the backup element housing is stuck to said valve housing such that said closeable path is blocked,
wherein said backup element is set to rupture at a threshold pressure that is greater than the first pressure and to release gas out of said conduit exit.
2. The safety unit of claim 1 and wherein at least a portion of said conduit is perpendicular to said closeable path.

3. The safety unit of claim 1 and wherein said backup element is a burst disk.

4. The safety unit of claim 3 and wherein said burst disk comprises a membrane manufactured from at least one of nickel, stainless steel and plastic.

5. The safety unit of claim 4 and wherein said backup element housing comprises two rings to hold said membrane.

6. The unit of claim 2 and wherein said valve is shaped to allow a flow of gas and liquid within to remove residue blocking said conduit.

7. A method for a safety valve, the method comprising:

receiving gas from a home carbonation machine;

providing a closeable path between a valve housing and a backup element housing, the backup element being pressable against the valve housing to close the closable path, and movable away from the valve housing by the gas when the gas is at a first pressure so as to open the closeable path to outside of the safety valve;

said carbonation machine opening said closeable path to outside of said valve housing during carbonation;

receiving said gas in a conduit of said backup element housing when said closeable path is blocked by the backup element housing sticking to the valve housing, said conduit having an exit outside of said safety valve; and rupturing an integrated backup element of said safety valve in said conduit to release gas out of said conduit exit at a threshold pressure that is greater than the first pressure.

8. The method of claim 7 and wherein said backup element is a burst disk.

9. The method according to claim 7 and also comprising removing residue within said valve.

* * * * *